United States Patent

Locher et al.

[11] Patent Number: 6,126,078
[45] Date of Patent: Oct. 3, 2000

[54] IDENTIFICATION MEDIUM WITH PASSIVE ELECTRONIC DATA CARRIER STORING A PLURALITY OF INDEPENDENT APPLICATIONS

[75] Inventors: Johann Locher, Wetzikon; Ulrich Graf, Winterthur, both of Switzerland

[73] Assignee: Kaba Schliesssysteme AG, Wetzikon, Switzerland

[21] Appl. No.: 08/952,314

[22] PCT Filed: Feb. 19, 1997

[86] PCT No.: PCT/CH97/00063

§ 371 Date: Jan. 21, 1998

§ 102(e) Date: Jan. 21, 1998

[87] PCT Pub. No.: WO97/34265

PCT Pub. Date: Sep. 18, 1997

[30] Foreign Application Priority Data

Mar. 11, 1996 [CH] Switzerland ................. 628/96

[51] Int. Cl.⁷ ................................. G06K 19/06
[52] U.S. Cl. ................. 235/492; 235/380; 235/382
[58] Field of Search ................. 235/380, 382, 235/385, 451, 472.02, 492; 902/3, 4, 5, 26; 340/825.31, 10.5; 711/156, 171, 172

[56] References Cited

U.S. PATENT DOCUMENTS

| | | | |
|---|---|---|---|
| 5,130,519 | 7/1992 | Bush et al. ................. | 235/380 |
| 5,161,256 | 11/1992 | Iijima ................. | 235/382 X |
| 5,317,309 | 5/1994 | Vercellotti et al. ................. | 235/380 X |
| 5,408,082 | 4/1995 | Takagi et al. ................. | 235/492 |
| 5,452,431 | 9/1995 | Bournas ................. | 711/115 |
| 5,473,145 | 12/1995 | Wallerstorfer et al. ................. | 235/382 |
| 5,542,081 | 7/1996 | Geronimi ................. | 235/380 X |
| 5,729,717 | 3/1998 | Tamada et al. ................. | 235/380 X |
| 5,736,728 | 4/1998 | Matsubara ................. | 235/492 |
| 5,844,244 | 12/1998 | Graf et al. ................. | 235/382 X |

FOREIGN PATENT DOCUMENTS

| | | |
|---|---|---|
| 0 292 248 | 11/1988 | European Pat. Off. . |
| 0 332 117 | 9/1989 | European Pat. Off. . |
| 0 617 387 | 9/1994 | European Pat. Off. . |
| 0 644 513 | 3/1995 | European Pat. Off. . |
| 2 591 008 | 6/1987 | France . |
| 2 606 909 | 5/1988 | France . |
| 37 40 794 | 6/1989 | Germany . |
| WO 92/13322 | 8/1992 | WIPO . |

*Primary Examiner*—Donald Hajec
*Assistant Examiner*—Jared J. Fureman
*Attorney, Agent, or Firm*—Walter C. Farley

[57] ABSTRACT

An identification medium with passive electronic data carrier and contactless, encoded communication with an associated read and write station (WR) has in a memory (42) a data organization with a common data field (CDF), with invariable, uncopiable master data (44), with a segmentable application data field (ADF), in which several independent applications can be written in application segments S1, S2, S3). A hierarchical authorization system (A) valid for all the identification media (IM-S) and all the read and write stations (WR) is established, with which each identification medium (IM-S) must be initialized and which ensures the mutual uninfluenceability of all the independent applications.

23 Claims, 11 Drawing Sheets

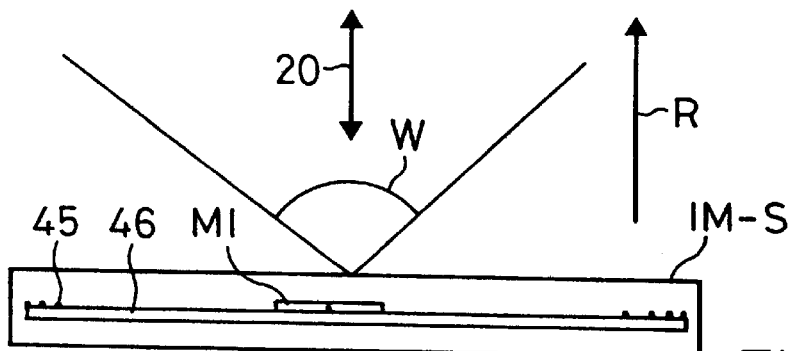
FIG. 3a
FIG. 3b
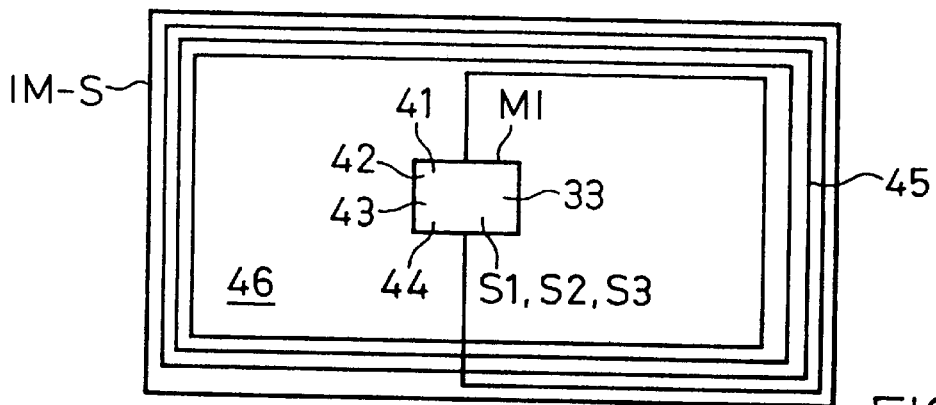
FIG. 7

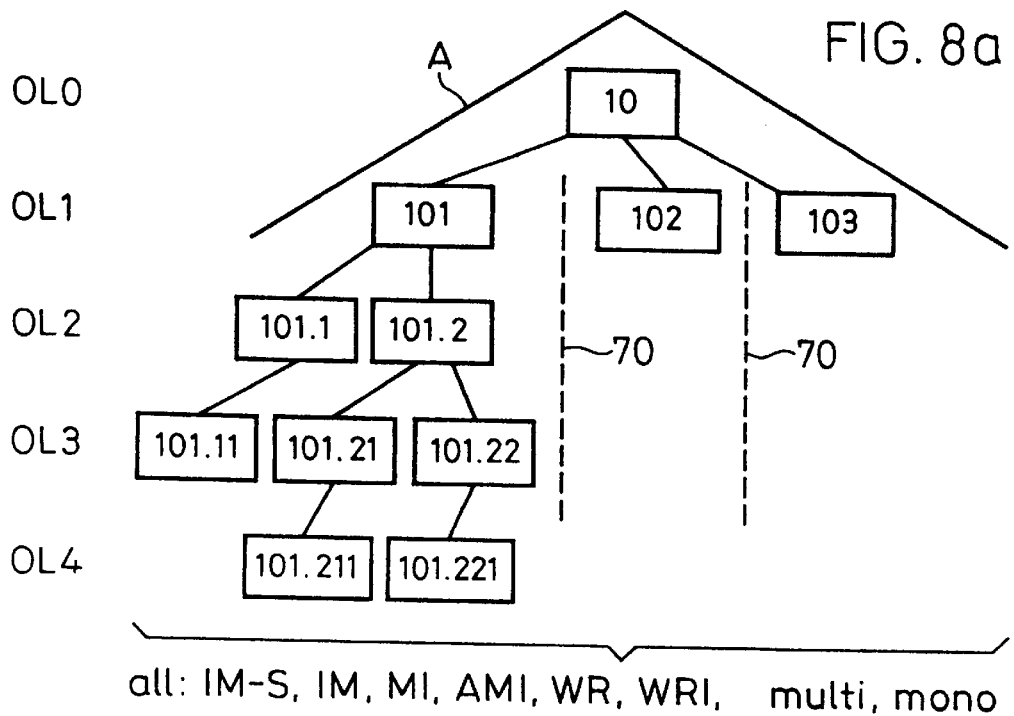
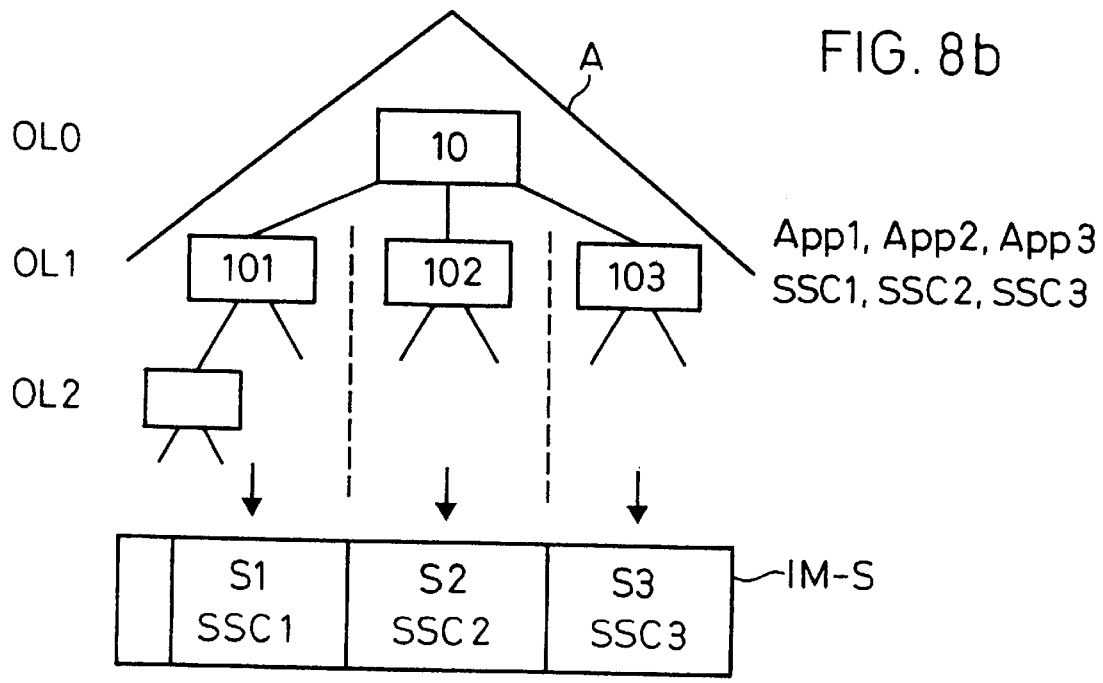

| | |
|---|---|
| Scash (S1,S2,S3,S4) SSC1 | S1, S2 S3, S4 |
| S1 SSC1 | App 1 |
| S2 SSC2 | App 2 |
| S3 SSC3 | App 3 |
| S4 SSC4 | App 4 |
| S5 SSC5 | App 5 |
| cash S5 | |

FIG. 17

IDENTIFICATION MEDIUM WITH PASSIVE ELECTRONIC DATA CARRIER STORING A PLURALITY OF INDEPENDENT APPLICATIONS

FIELD OF THE INVENTION

This invention relates to an identification medium with a passive electronic data carrier, a system with identification media and a method for initializing an identification medium.

BACKGROUND OF THE INVENTION

Identification media are known for various applications, e.g., as access cards for specific areas of a company (electronic code), for time management, as access media for the use of equipment, e.g., data systems, and also as credit/debit card systems for procuring services. For each independent application an independent medium is required, e.g., in the form of a card or an electronic code. A new application which a user wishes to implement requires an additional new medium. Thus, a user wishing to use various applications must carry a corresponding number of individual media. This is both costly and cumbersome and there is also a risk of losing or forgetting one of the numerous media or cards and then not to have it available when required.

SUMMARY OF THE INVENTION

An object of the invention is to overcome the inadequacies and restrictions of the hitherto known solutions and to provide an identification medium with which several independent applications can be used with a single medium. The handling is simple and contactless and reliably operates in a hands-free manner. The security of the transmitted data must be guaranteed also with respect to faults, losses, including attempted fraud and the independence of the different applications must be so secured that no undesired influencing of other applications is possible. It also can include additional applications added subsequently on the same identification medium.

BRIEF DESCRIPTION OF THE DRAWINGS

The invention is described in greater detail hereinafter with reference to embodiments in the attached drawings, wherein:

FIGS. 3a and 3b are schematic side elevation and top plan views, respectively, of an identification medium with a large-area antenna;

FIG. 7 is a diagram of the association between organization levels and an implemented stamp;

FIGS. 8a and 8b are diagrams of the hierarchical authorization concept A of the system for all identification media and all associated read and write stations with organization levels;

FIG. 17 is a diagram showing an example of a system used at a holiday location with several independent applications.

DETAILED DESCRIPTION OF PREFERRED EMBODIMENTS

Figure 1:
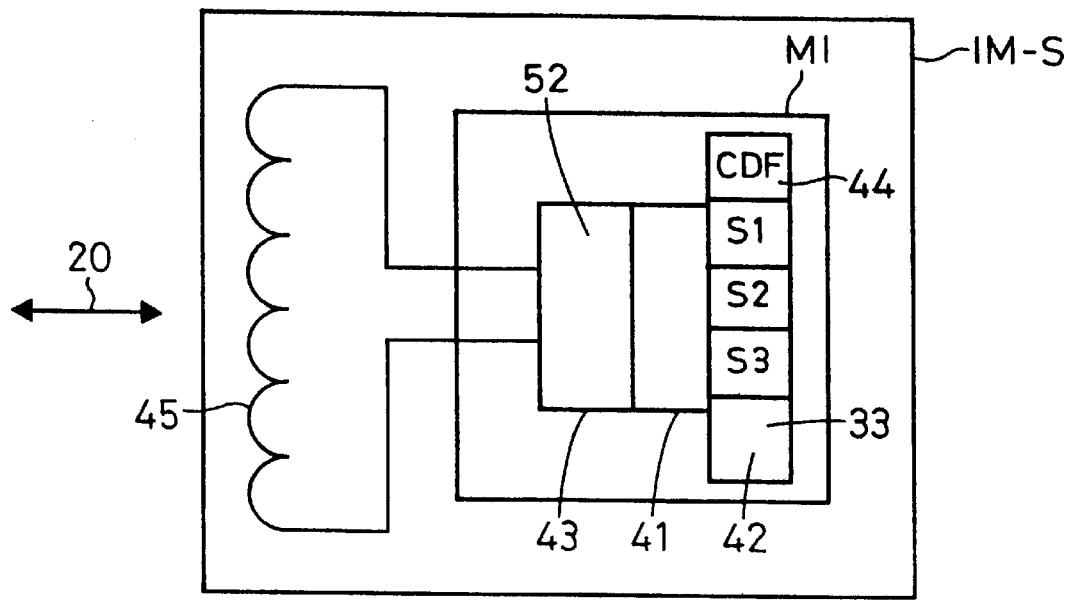
FIG. 1 is a schematic circuit diagram of an identification medium according to the invention with a segmented application data field AD.

FIG. 1 schematically shows an identification medium IM-S according to the invention with an integrated passive data carrier MI whose operating energy is supplied by a read and write station WR and received by a high frequency (HF) antenna 45. Data carrier MI has a highly integrated special chip (ASIC) with a processor 41, a data store 42 (e.g., in the form of an EEPROM) as well as control electronics 43. The control electronics and processor control the entire external and internal data exchange, encode the transmission data and decode the received data and contain the entire high frequency part for supplying antenna 45, including the clock preparation and synchronization for receiving energy and data from transmitting station WR.

Antenna 45 can have a relatively large-area construction, as shown in FIG. 3b, so that there is a relatively large communication range R for all applications or application segments S1, S2, S3.

Figure 2:
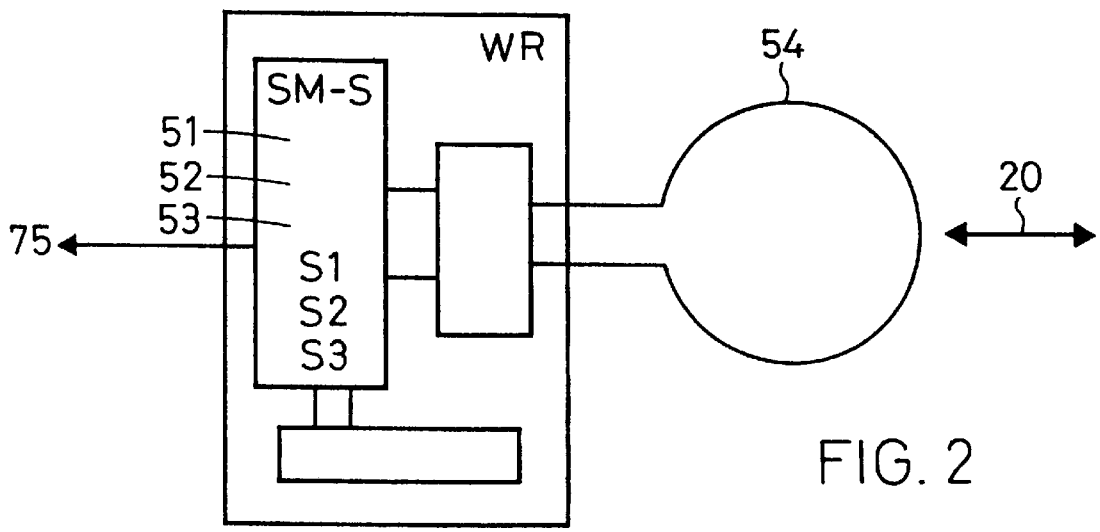
FIG. 2 is a schematic diagram of an associated decentralized read and write station WR.
Figure 10:
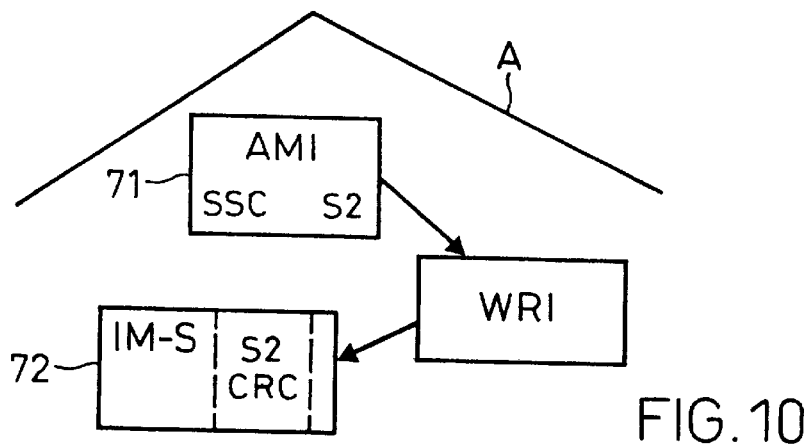
FIG. 10 is a diagram of the uncopiable production of identification media.

Arrow 20 illustrates the HF communication with read and write station WR, shown in FIG. 2. Data carrier MI contains an invariable system program with security functions such as check sum control CRC and encrypting code 52. Data store or memory 42 contains several independent application segments S1, S2, S3 for freely available applications of independent users or licensees (SSC). As will be explained hereinafter, memory 42 has a data organization with a common data field CDF which contains invariable, uncopiable master data with a unique record number 44, with a segmental application data field ADF, in which can be written or entered several independent applications (App1, App2, App3) in application segments S1, S2, S3, each application segment containing a segment identification. For all the identification media IM-S and all the associated read and write stations WR is fixed a hierarchical authorization system A with which each identification medium IM-S must be initialized and with which is ensured the mutual uninfluenceability of all the independent applications with their application segments S1, S2, S3 (FIGS. 8 and 10). As a result of this construction, the identification carrier according to the invention cannot be read out or modified with respect to any application and is also not hardware-duplicatable.

FIG. 2 diagrammatically shows an autonomous read and write station WR, functioning in a decentralized manner, associated with identification media IM-S for the contactless communication with media IM-S. The read and write station has a security module SM-S, a separate transmitting and receiving antenna 54, a power supply and an additional interface to a master computer 75. Security module SM-S contains all the communications functions with data carriers MI or an associated application segment of the identification medium. This comprises HF preparation, encrypting and checking of the data for correct transmission, checking of the read and write authorization, an identification medium or application segment through the read and write station and communication with a master computer. The security functions comprise encoding and decoding the data, identifying the data carrier MI and the relevant application segment, as well as the calculation of check sums (CRC) for error-free data transmission. The communication sequence between identification media IM-S and read and write stations WR will be explained hereinafter with reference to FIG. 11.

FIGS. 3a and 3b show in two views the structure of an identification medium IM-S with a data carrier MI and an antenna 45. These elements are preferably constructed in one piece and for this purpose are, e.g., placed on a printed circuit 46. As is apparent from FIG. 3, the antenna area can be made relatively large, so that for all the applications and application segments of an identification medium IM-S, particularly good communications characteristics can be achieved. These are in particular a large range R of up to several decimeters and a large solid angle range W, in which communication can take place, and an extensive independence of the relative positioning of the identification medium and the associated read and write station WR. Because it is possible, with a single identification medium IM-S according to the invention, to replace numerous hitherto individual identification media each having only one application, the multi-identification medium IM-S can be given a correspondingly greater degree of complication, e.g., having a large antenna and further characteristics improving communications and range. In addition, naturally a considerable cost saving is also achieved.

Figure 4A:
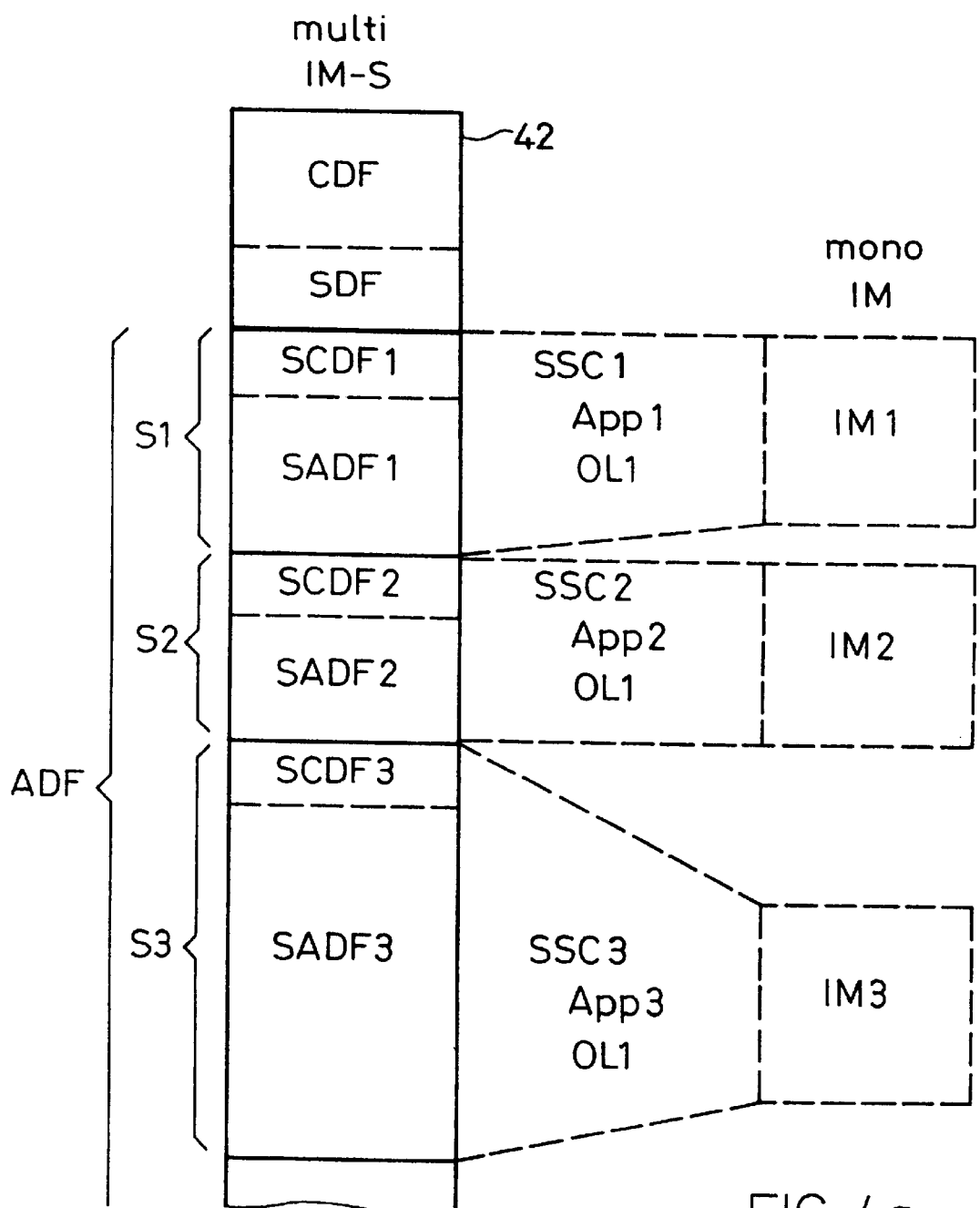
FIGS. 4a and 4b are layouts of data organizations with a common data field and segmented application data field with several application segments.
Figure 4B:
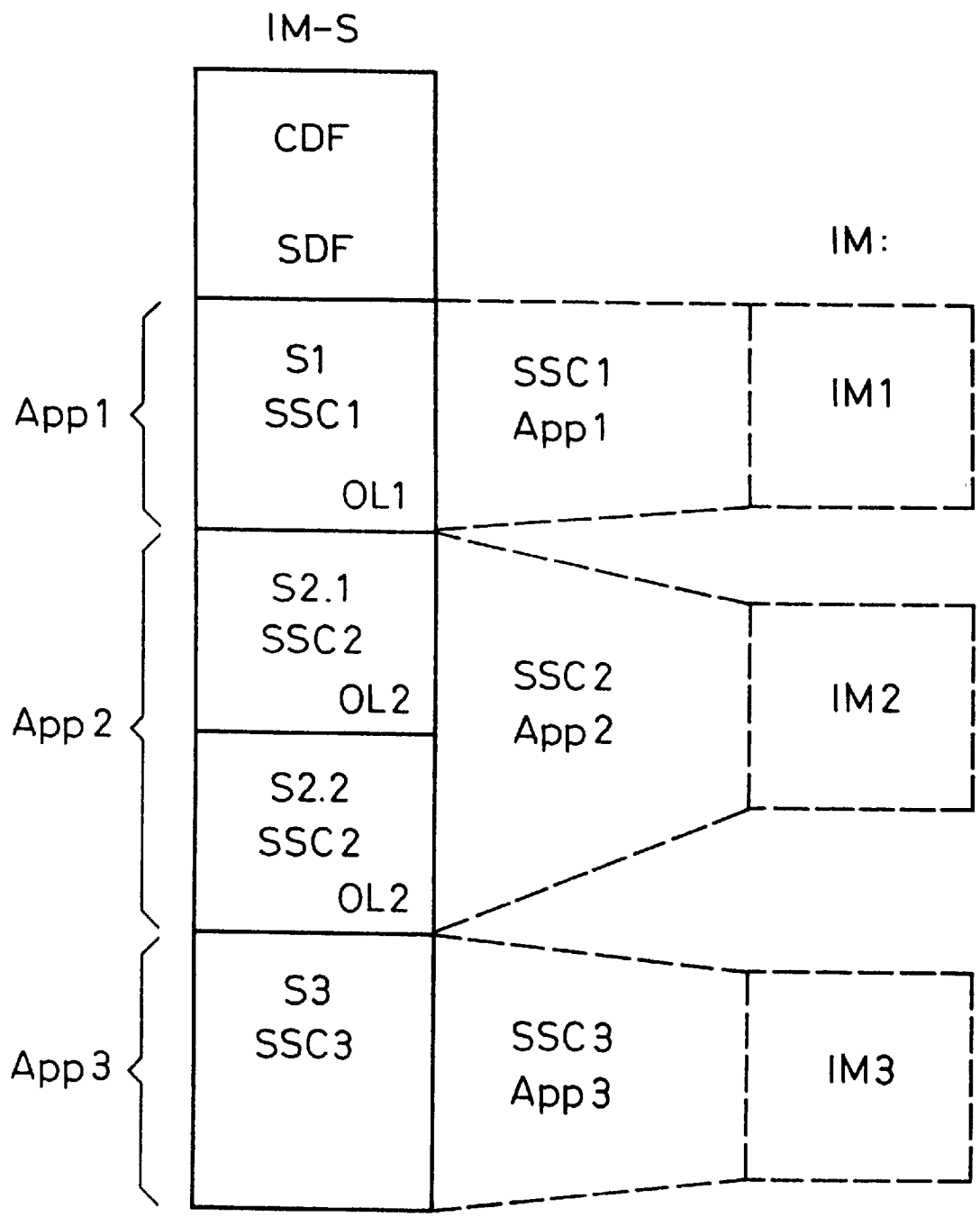
Figure 5:
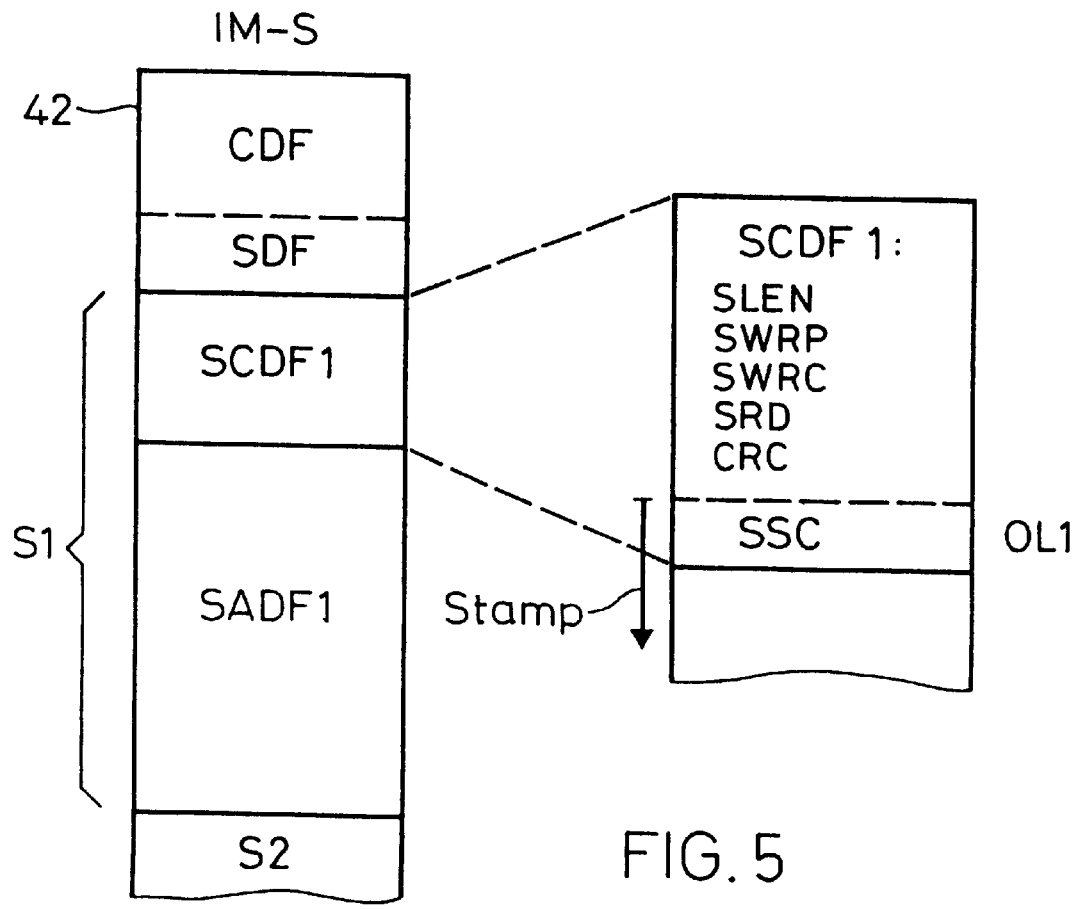
FIG. 5 is a schematic block diagram of data organization of an application segment with a segment header SCDF and application data field SADF.
Figure 6:
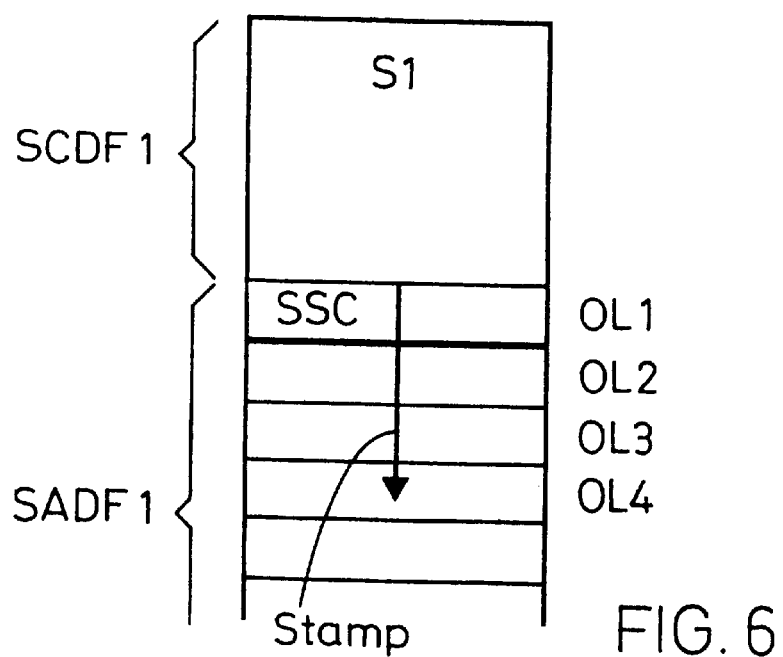
FIG. 6 is a diagram of data organization of an application segment with an implemented stamp.

FIGS. 4 to 6 illustrate the data organization of memory 42 of segmented identification media IM-S according to the invention. Preferably, variable memory 42 as an EEPROM has at least a 256 byte storage location. As a function of requirements, i.e., in accordance with the number and size of application segments S1, S2, S3, etc., which must be housed in an identification medium IM-S, it is also possible to use a larger memory, e.g., with 1 Kilobyte, 4 Kilobytes, etc. The memory size of each application segment is advantageously freely selectable, so that as a function of needs and up to the filling of the entire memory capacity, one application after the other can be entered in each identification medium IM-S.

FIG. 4a shows a data organization with a segmented application data field ADF, which has three application segments S1, S2, S3 of different sizes. These three segments correspond to three independent applications App1, App2, App3 of three independent users or licensees with licensee numbers SSC1, SSC2 and SSC3. In the case of the hitherto known, unsegmented identification media, a separate medium IM1, IM2 and IM3 was necessary for each application.

The example of FIG. 4b shows a data organization of an identification medium IM-S, which has an independent application App2 of a licensee SSC2, which has more than one application segment (application segments S2.1 and S2.2). In principle, licensee SSC2 within the framework of application App2 can also fix certain connections between the segments S2.1 and S2.2 at a lower organization level OL2. This will be explained hereinafter referring to FIGS. 7 to 10. Here again, applications App1, App2 and App3 are completely independent of one another.

FIG. 5 shows a data organization of an application segment S1 with a segment header SCDF1 and an application data field SADF1. In the segment header SCDF are established valid information and conditions for the particular segment(S1). Data field SADF1 is freely available for the application. Each application segment has in segment header SCDF a user number SSC, as well as read and write conditions for the application segment. Preferably, the following read and write conditions are established:

WRP=write-protect; this establishes the number of write-protected bytes in the memory.

WRC=write condition, which determines which read and write stations may read and write the identification medium, these only being read and write stations containing a corresponding launch data set.

RD=read disable, which means a read protection, i.e., establishing where the data carrier may and may not be read.

With these conditions, each identification medium IM-S establishes to and from which stations it can read or write. Each application segment advantageously also contains an indication of the segment length LEN and a check sum control CRC of this application.

On launching a read and write station WR associated with the identification media IM-S, within the framework of the authorization system A by means of a special launching medium, a launch data set is entered in read and write station WR containing the authorization to process an identification medium corresponding to said launch data set. Each launch data set begins with the user number SSC, corresponding to the independent application, and the launch data set also establishes these read and write conditions. Thus, an un-launched read and write station WR cannot read and write a protected identification medium.

FIG. 6 illustrates the implementing of the stamp of each segment, e.g., application segment S1. The implementing of said base data is explained in greater detail referring to FIGS. 7 to 9.

The necessary implementing of the stamp is further illustrated in FIG. 7. The length of the implemented stamp increases proportionally to the organization level OL. Here, e.g., the stamp increases by 1 byte if the organization level OL increases by one stage, e.g., from OL2 to OL3.

Figure 9:
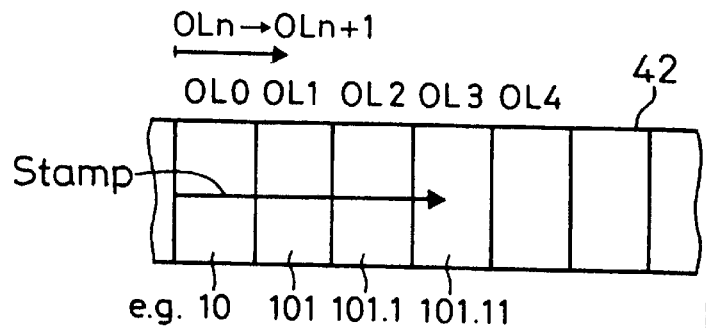
FIG. 9 is a diagram of the link between the organization level and data organization.

FIGS. 7 to 9 illustrate authorization concept A valid for all identification media and all associated read and write stations of the system with the hierarchical organization levels and the necessary transmission of stamps, with which the general maintaining of the system rules is ensured.

FIGS. 8a and b illustrate the hierarchical authorization concept A, which applies to all data carriers MI and to all read and write stations WR, as well as to all authorization data carriers AMI and programming stations WRI of the system and which has hierarchical organization stages or levels OL0, OL1 OL2, OL3, OL4, etc.

The highest stage, organization level OL0, corresponds to the system stage, i.e., the owner or licensor 10 of the entire system.

The next lower stage OL1 corresponds to different, independent users or licensees 101, 102, 103, etc. of the system, e.g., different firms, corporations, municipalities, etc. This stage also corresponds to different independent applications, i.e., each independent licensee and each independent application is allocated an SSC number, which differentiates the same from all other SSC numbers.

The next lower stage OL2 corresponds to different uses 101.1, 101.2 of a user 101, e.g., different subsidiaries of a company 101.

The next stage OL3 corresponds to different areas of a use, e.g., areas 101.11 of subsidiary 101.1 and areas 101.21, 101.22 of subsidiary 101.2.

The next stage OL4 corresponds to different subareas of 101.21, 101.22, etc.

This hierarchical authorization system ensures that different independent applications App1, App2, App3, etc. cannot mutually influence in any way independent users 101, 102, 103, but a user, e.g., 101, can freely establish the organization in his area, i.e., as from OL2. This is illustrated by the separation lines 70 in FIG. 8. This guarantees that no misuse of any nature is possible from this side because, e.g., applications of 101 are not generally authorized in 102 and 103.

With each downward step of an organization stage OLn to OLn+1 in this authorization system, the powers of the data carrier are limited, so that they only apply downwards, i.e., for organization stages with a higher number.

For this purpose, in the application segments of a specific organization stage all the fixed-written data of the higher organization stage are necessarily entered, i.e., quasi-inherited, as is illustrated in FIG. 9. For each lower organization stage OLn+1 an additional memory part is fixedly written in the memory 42 and simultaneously all the data of the higher organization stage OLn are taken over. Thus, successively e.g., 10, 101, 101.1, 101.11 are entered in the memory parts of organization stages OL0, OL1, OL2, OL3. Whereas, as explained hereinbefore, in known unsegmented identification media, an independent medium IM was required (monomedia) for each independent application (101, 102, 103, etc.), it is now possible in the manner shown in FIG. 8b to combine several, randomly selectable, independent applications on a single identification medium IMS (multimedium). For example, more than 100 independent applications or licensee numbers SSC can exist and in the segmented identification medium IM-S, it is in principle possible to receive a randomly large number of such independent application segments, provided that the storage capacity of the medium allows it.

This authorization principle is made clear by FIG. 10 which illustrates the production or initialization of identification media with data carriers MI. All the data carriers or identification media of the system must be produced as a slave medium 72 using a master medium 71 (as authorization data carriers AMI) and a special programming read/write station WRI. To a new and as yet unwritten identification medium or an application segment (here, e.g., S2) of the system must necessarily be transmitted an unerasable stamp 71 for the application S2 to the slave medium 72 and is, so to speak, inherited or implemented. This takes place in accordance with the rules of hierarchical authorization system A. The identification medium produced (as slave medium 72) is also initialized by the master medium 71 as the authorization data carrier AMI. This initialization is the prerequisite for the authorization for use of application segment S2 and identification medium IM-S in the system. Only initialized identification media and application segments are authorized as valid by the read and write stations WR of the system. Each authorization medium AMI contains a user number SSC, so that it can only initialize and write application segments with the same user number SSC.

Figure 11:
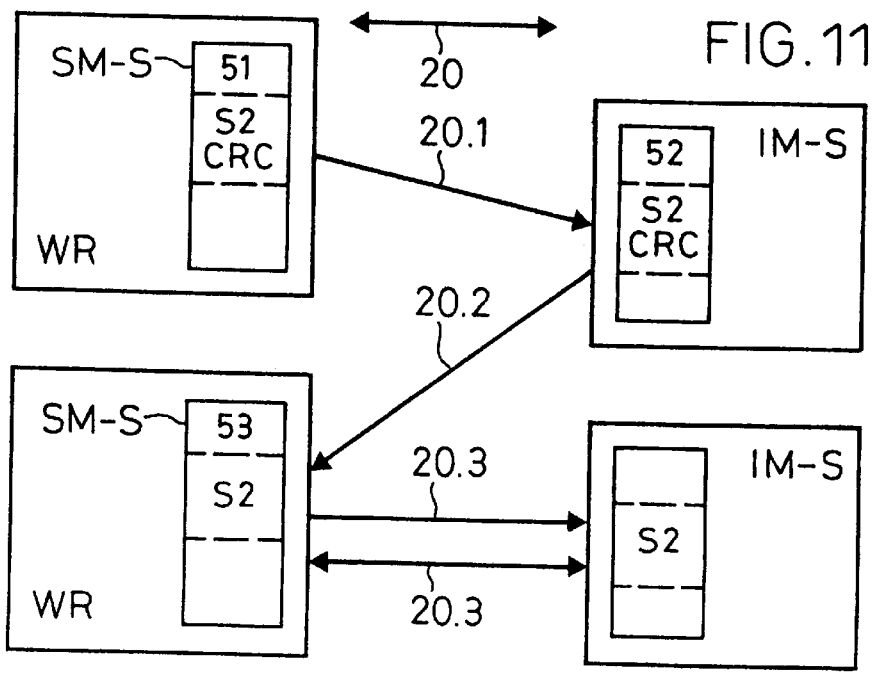
FIG. 11 is a diagram showing the function and sequence of communication between an identification medium and a read and write station.

FIG. 11 shows the communication 20 between a read and write station WR with security module SM-S and a data carrier MI or an application data field S2 of identification medium IM-S. The necessary electromagnetic HF field energy (e.g., with a carrier frequency of 13 MHz) is transmitted together with the modulated information from read and write station WR to data carrier MI. At the latter, the field energy is collected by antenna 45 and used for the operation of passive data carrier MI, as well as for transmitting the encoded information to the WR. A particularly rational performance of this information transmission involves the carrier frequency modulating in one direction, e.g., from read and write station WR to data carrier MI, by pulse modulation and in the opposite direction (from MI to WR) by load modulation.

FIG. 11 illustrates an interception-proof sequence of the communication between read and write station WR and an application segment S2 of identification medium IM-S. As soon as an identification medium enters the field of a read and write station WR, there is an automatic start of the sequence for synchronizing WR and IM-S.

For each new identification process, read and write station WR produces new initialization data 51 (e.g., in the form of random numbers) and transmits them to identification medium 20.1. Thus, there is a linking of initialization data 51 with a fixed-stored encrypting code 52 of the identification medium. The encoded result (a code word) is then transmitted back to read and write station 20.2.

This information is then decrypted in security module SM-S and a check is made 53, i.e., decoded with the encrypting code 52 also stored in WR, and is compared with the original random initialization data 51. On the basis of this result, the WR can establish what type of medium is involved.

Subsequently and without interruption, there can be synchronized communication 20.3 between read and write station WR and the application segment S2 of identification medium IM-S.

Using this method, the clock generators and code generators of WR and IM-S are synchronized. After the communication process with an application segment has been concluded or broken off, each new communication (with the same or a different application segment) must again start with new initialization data 51. A recording of the transmitted data and a subsequent feeding back into the field is consequently impossible, because the original initialization data 51 are no longer valid. It is therefore impossible to produce copies of functioning identification media.

In addition, the transmitted data are checked by a CRC check, i.e., by a check sum control, in which, e.g., useful data are linked with master data of data carrier MI. Thus, faulty data transmissions are substantially excluded. This is particularly important if sensitive data or value changes are entered by an authorized read and write station in an application segment and where newly entered data must be checked prior to their acquiring validity. Thus, this communication sequence ensures that there is no interception of the communication which can be misused for producing fraudulent application segments on the identification media.

Figure 12:
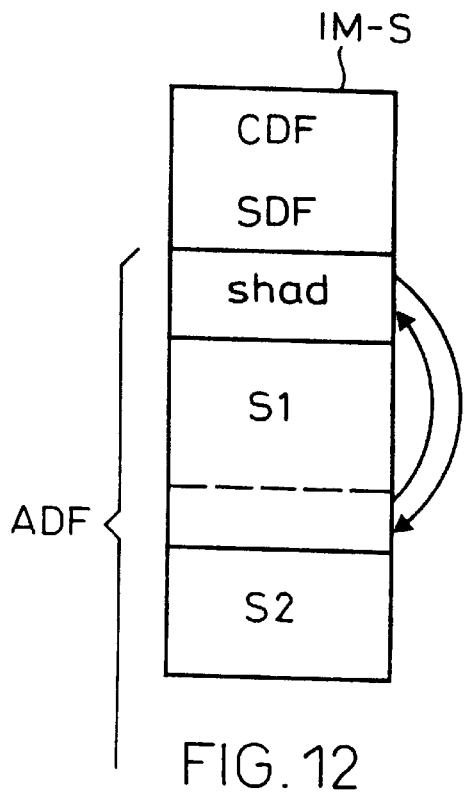
FIG. 12 is a diagram illustrating the function of a shadow memory in the application data field.

FIG. 12 shows as a further security element a shadow memory in the application memory ADF. If a communication process between identification medium IM-S and read and write station WR is disturbed or interrupted, where new sensitive data are entered in the data carrier, it is important that no sensitive data are lost or undesirably modified.

Therefore, such a communication process with sensitive data should either be performed completely and correctly or an incomplete or incorrect data transfer must be canceled as a whole. Such a disturbance or interruption of a communication process can in particular occur if the identification medium is removed from the transmitting area R of the read and write station during the communication process. By means of a shadow memory shad in the identification medium, it is ensured that each communication process is either completely entered or is not entered at all. First, the old data in the ADF or in a segment are transmitted into the shadow memory and checked. When the old data are correctly present in the shadow memory, the new data are transmitted by the read and write station into the application segment and checked there. If the transmitted new data are complete and correct, they remain in valid form in the application segment. If the new data have not been correctly and completely transmitted, all the new data in the application segment are erased and once again the old data are written back from the shadow memory into the application segment. Subsequently, the communication process can be repeated in the same way until the new data have been correctly and completely entered in the application segment of the identification medium.

Figure 13:
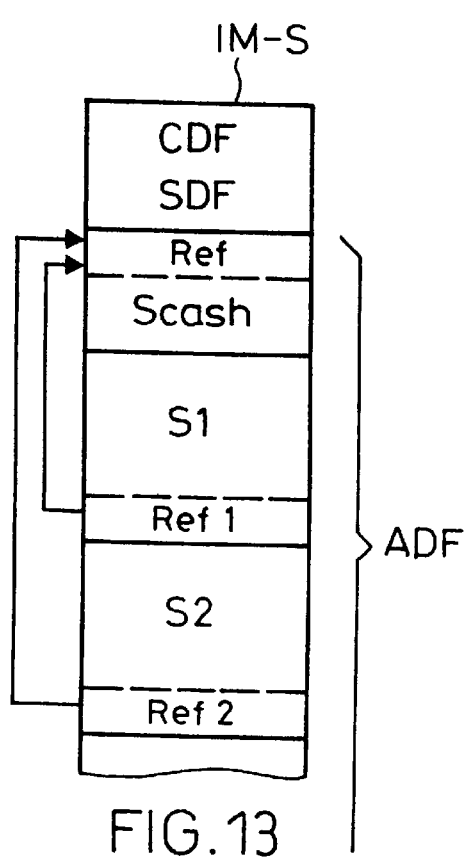
FIG. 13 is a diagram of a common cash segment as an application segment in ADF.

FIG. 13 shows as an important application example a common cash segment as an application segment Scash in the identification medium to which other authorized application segments S1, S2, S3 are to have access. Access to the application segments takes place by means of a system code in a reference area Ref. Each segment also has a segment reference area Ref1, Ref2, Ref3. Thus, the common cash segment Scash at an associated read and write station can be charged as a money charging station in accordance with a paid in sum. This credited sum on the identification medium IM-S can be successively used up at different stations of application segments S1, S2, etc. The individual sums are charged to the corresponding application segments S1, S2, etc. The deductions on the side of the identification medium IM-S consequently correspond to the settlements on the side of application stations WR.

Figure 14:
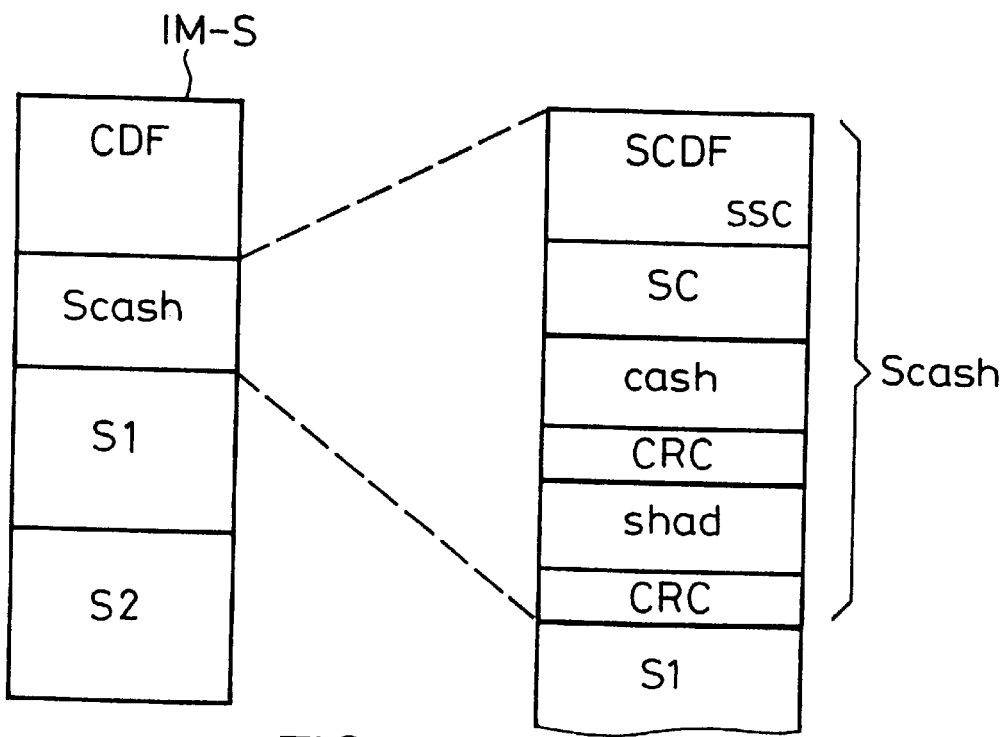
FIG. 14 is a diagram of an example of data organization with a common cash segment.

FIG. 14 shows an example of a data organization of a common partial segment Scash with a segment header SCDF, a reference area with a system code SC, a shadow memory shad, the cash segment cash and the check sum controls CRC with respect to said areas.

Figure 15:
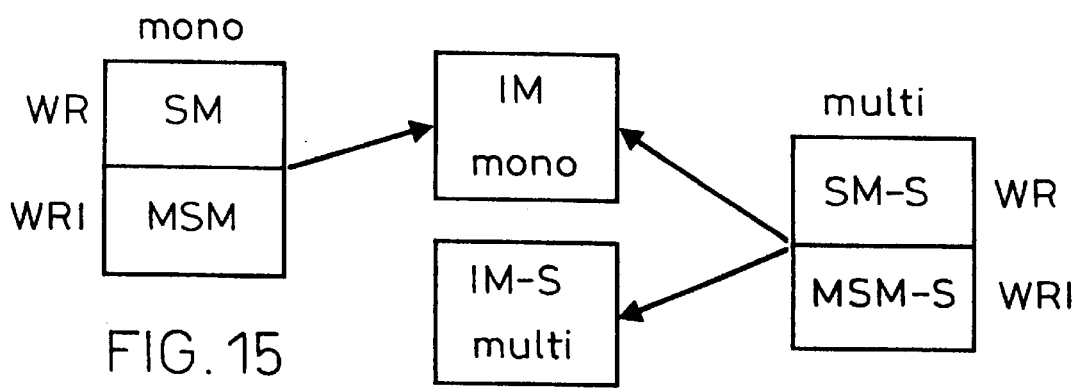
FIG. 15 is a diagram of the system compatibility of segmented and unsegmented identification media.

FIG. 15 illustrates the system compatibility of segmented identification media IM-S (multi) and unsegmented identification media IM (mono) with respect to the associated read and write station WR with corresponding security modules SM-S (multi) and SM (mono), as well as with the associated programming read and write stations WRI with security modules MSM-S (multi) and MSM (mono). As can be gathered from FIG. 15, the system is upwardly compatible, i.e., mono-identification media can be additionally processed or produced by segmented security modules SM-S of the read and write stations and security modules MSM-S of the programming stations. Thus, in the system with segmented media IM-S can also be used unsegmented media IM, or an existing system with mono-media can be additionally equipped with multimedia IM-S. The securing of this compatibility takes place by the data organization in the system data field SDF of the segmented identification media IM-S.

Figure 16:
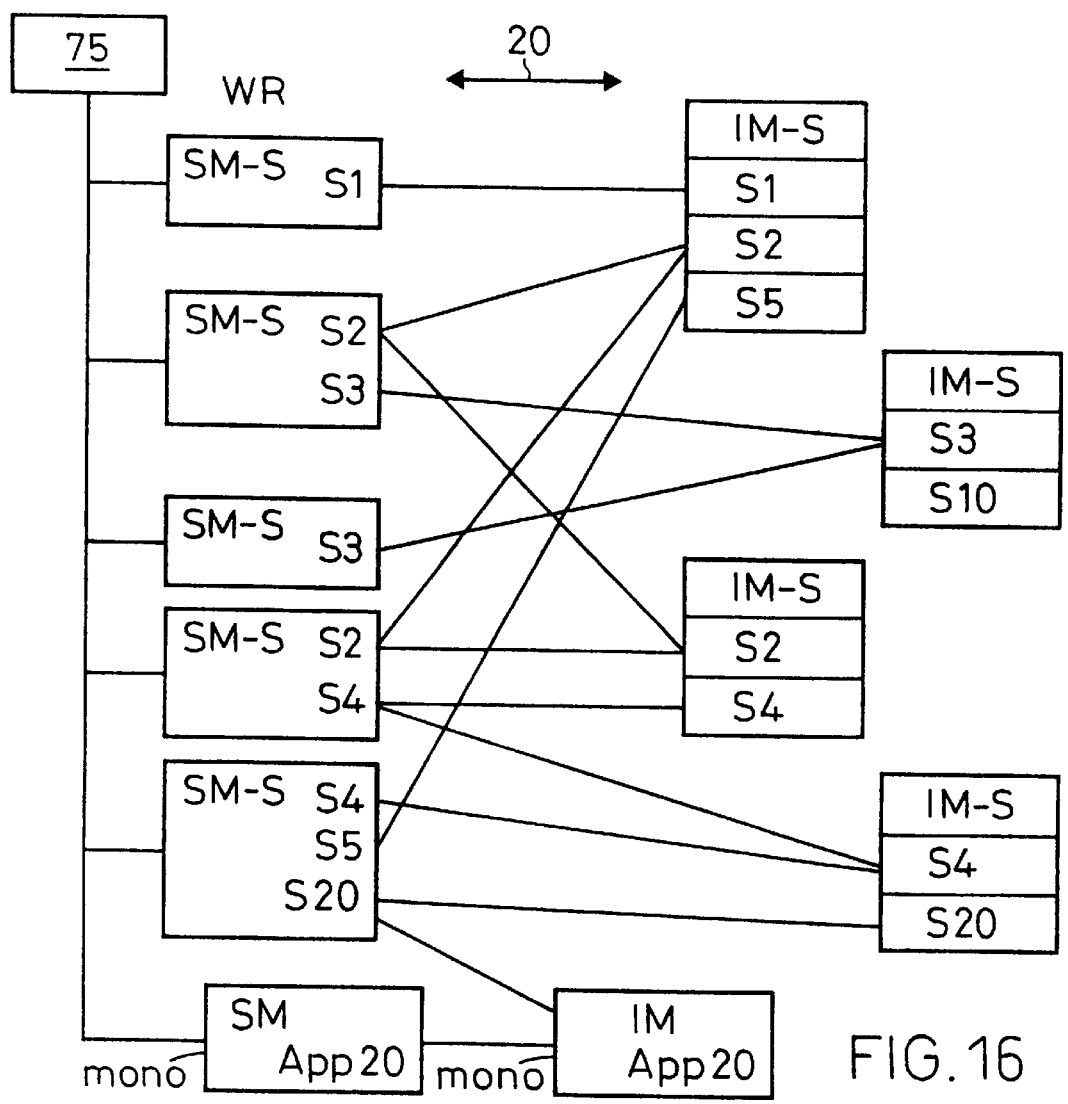
FIG. 16 is a diagram illustrating an example of a system with several independent applications with several read and write stations and several segmented identification media.

FIG. 16 schematically illustrates a system having several independent applications, here with segmented identification media IM-S, which have a random number of combinations of application segments from S1 to S20. The independent applications App1 to App20 correspond to independent licensees or users with numbers SSC1 to SSC20 and they correspond to the application segments S1 to S20. The associated decentralized and autonomously operational read and write stations WR have launch data sets for one or more applications S1 to S20. Read and write stations WR are additionally connectable to a master host computer 75. Into this system are also incorporated unsegmented identification media IM, as shown by the example with S20. This corresponds to the system compatibility according to FIG. 15.

FIG. 17 shows as an example a system in a geographical region, such as in a vacation region, with independent users SSC1 to SSC5 with corresponding independent applications and application segments S1 to S5. Applications S1 and S2 are two different mountain railway and ski lift regions which are managed by the corresponding railway companies as users SSC1 and SSC2.

Application S3 is a public bus, swimming pool, sports facilities, parking garages and a hotel, which are managed by the municipality as SSC3.

Application S4 is various shops, which are managed by an association of individual owners as user SSC4.

Application S5 consists of telephone and postal services controlled by the PTT as user SSC5.

Application segment S5 has its own cash segment, whereas segments S1 to S4 have a joint cash segment Scash.

Here, a segmented identification medium IM-S according to the invention can, in principle, have random combinations of segments S1 to S5 and the individual segments, corresponding to the establishment of the corresponding user, can again be freely structured (cf. FIG. 8).

Another example is a system with various companies as independent users. Application segments can be available to in each case one company or the employees thereof. Other application segments can be jointly operated by two or more companies, e.g., for a common infrastructure and equipment, while further application segments can be available to outsiders as well as to company employees, e.g., a personnel restaurant or a swimming pool, and different use prices can be established for different users.

The identification medium can be additionally combined with a personal encoding function, in order to be able to satisfy particularly high security requirements in specific applications. For this purpose, use can, e.g., be made of a PIN code or biometric data codes. Personal biometric data, such as, e.g., fingerprints or finger, hand and head geometries can be established and compared with corresponding codes 33 stored in data carrier MI (FIGS. 1, 3b and 18b) for the purpose of personal identification and verification of an authorized user.

The identification media IM-S can be implemented in various, per se known forms, e.g., as cards. However, they can also be combined with another element, e.g., with a personal article, such as a bracelet, which is always worn by a person. As a result of this combination or connection of identification medium and carried or worn personal article, it is ensured that the identification medium is always carried and therefore always available to the authorized person when it is required. As opposed to this, cards can be forgotten in pockets of clothing.

FIG. 18 shows an example of a portable identification carrier 1 as an identification medium IM-S in two views 18a, 18b. The identification carrier is interchangeably fixed in a suitable position to a personal bracelet PA worn on arm 11. The identification carrier consists of a separate, flat carrier element 1 and a detachable fastening device 3, which allows replacement of personal bracelet PA. Carrier element 1 contains the passive, integrated electronic data carrier MI with processor, electric circuit and memory, as well as an antenna 45 surrounded by a dielectric 4, here on both sides by a dielectric covering layer. Antenna 45 (here in the form of an antenna loop) has at least partly open antenna radiating surfaces FAO, which are not covered by electrically conductive parts or electromagnetically opaque material of the personal bracelet. An illustration is provided in FIG. 19. For optimum adaptation to the roundness of arm 11 and the bracelet, the data carrier can be easily bendable and is advantageously made from flexible material, e.g., plastic. Fastening device 3 is connected in one piece to carrier element 1 and comprises, e.g., one or two bands 8 with, in each case, opposite, inter-connectable ends. Carrier element 1 is fitted beneath bracelet PA, i.e., between arm 11 and the bracelet. The ends of bands 8 surround bracelet PA, so that, facing arm 11, they can be closed together over bracelet PA. The length of the closure is adjustable in such a way that it can be adapted in optimum manner to different cross-sectional circumferences of personal bracelet PA and for this purpose, e.g., positive closure elements are placed on the ends of bands 8 (FIG. 19).

Figure 18A:
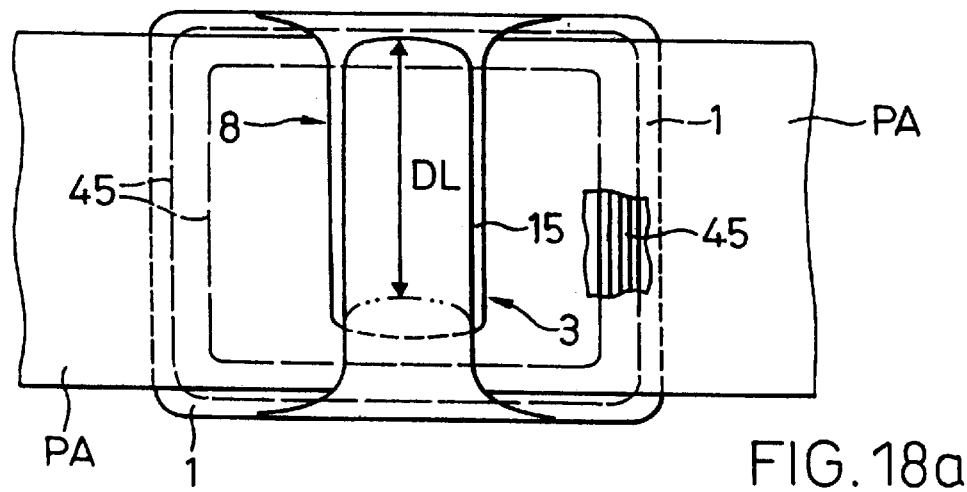
FIGS. 18a, 18b and 19 are illustrations of examples of identification media which can be carried as identification carriers on a personal bracelet.
Figure 18B:
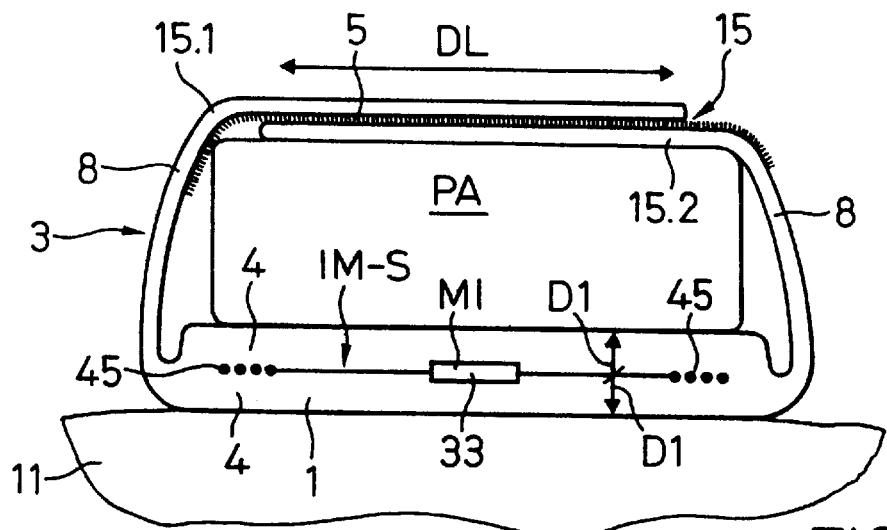
Figure 19:
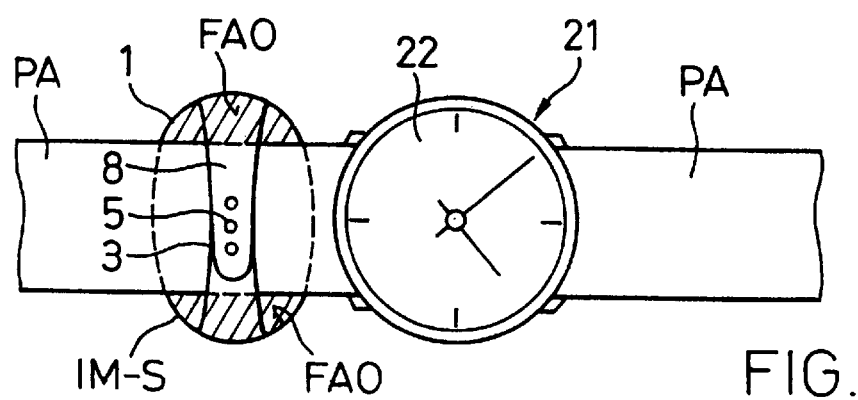

FIGS. 18a and 18b illustrate an example of fastening devices with Velcro® hook and loop fasteners 15 at both band ends of a wide, central band 8. On one band end is fitted loop part 15.2 of the Velcro® hook and loop fastener and the counterpart, i.e., hook part 15.1, is located on the other band end. The lengths of these two Velcro® hook and loop fastener parts 15.1 and 15.2 is chosen in such a way that it is possible to achieve a maximum length change DL of the fastener, adapting to personal bracelets PA of different sizes. The Velcro® hook and loop fastener allows a particularly simple and practical replacement of personal bracelet PA. Using a suitable design of material and position of the two hook and loop fastener parts 15.1 and 15.2, it is possible to achieve secure closure or fastening, which does not open under normal conditions of use.

In the view of FIG. 18b, in the cross-section for personal bracelet PA, the structure of the carrier element is shown with a data carrier MI, as well as with a flat antenna 45, which can, e.g., be applied as an air loop or winding to a printed circuit. On either side of the antenna is applied a dielectric covering 4, which has a thickness D1 of, e.g., preferably at least 0.5 mm and which can, e.g., be 0.5 to 1 mm.

In another construction, carrier element 1, e.g., together with fastening device 3 as an elastic fastener, can form a clamp embracing bracelet PA. In a further variant there is a fastening procedure using four elastic tabs, which are fitted as a fastening device to the corners of the carrier element and can be clipped onto personal bracelet PA. Carrier element 1 and fastening device 3 can also be constructed as two separable and firmly attachable parts. Another variant is formed by ferrite antennas in place of loop antennas, e.g., in the form of a flat ferrite rod with electric winding, whose axis is parallel to forearm 11

Various positions are possible with respect to bracelet PA. Carrier element 1 can be placed below the bracelet, on the top of the bracelet or laterally alongside the bracelet.

FIG. 19 shows an example with a wristwatch 21 as a personal bracelet PA, which positions carrier element 1 below the bracelet and alongside watch 22 and which is fixed by a band 8 as the fastening device. Here again there are relatively large, open antenna radiating surfaces FAO not covered by bracelet PA.

LIST OF REFERENCE NUMERALS

| | |
|---|---|
| 1 | Carrier element |
| 3 | Fastening device |
| 4 | Dielectric, cover |
| 5 | Closure of 3 |
| 8 | Bands of 3 |
| 10 | System owner, licensor |
| 101, 102 | Independent users, licensees |
| 101.1, 101.2 | Uses of 101 |
| 11 | Arm, wrist |
| 15 | Velcro fastener |
| 15.1 | Hook part |
| 15.2 | Loop part |
| 20 | Communication HF signals |
| 20.1, 20.2, 10.3 | Communication sequence |
| 21 | Wristwatch |
| 22 | Watch |
| 33 | Personal biometric encoding functions |
| 41 | Processor |
| 42 | Memory |
| 43 | Control electronics |
| 44 | Master data with unique record number |
| 45 | Antenna |
| 46 | Printed circuit (IC) chip |
| 51 | Initialization data (random numbers) |
| 52 | Encrypting code in MI |
| 53 | Decrypting in WR |
| 54 | Antenna WR |
| 70 | Separation line |
| 71 | Master medium |
| 72 | Slave medium |
| 75 | Master computer |
| App1, App2 | Independent applications (SSC) |
| MI | Data carrier |
| AMI | Authorization data carrier |
| WR | Read and write station |
| WRI | Programming read/write station |
| CRC | Check sum control |
| A | Authorization system |
| OL0, OL1, OL2 | Organization level |
| W | Solid angle range for communication |
| R | Communication range |
| IM | Identification medium (mono), unsegmented |
| IM-S | Identification medium (multi), segmented |
| SM | Security module of WR (mono) |
| SM-S | Security module of WR (multi), segmented |
| MSM | Security module WRI (mono) |
| MSM-S | Security module of WRI (multi) |
| S1, S2, S3 | Application segments |
| CDF | Common data field |
| SDF | System data field |
| ADF | Application data field |
| SCDF | Segment header |
| SADF | Segment application data field |
| SSC | User number, licensee number |
| WRP | Write protect |
| WRC | Write condition |
| RD | Read disable |
| LEN | Segment length |
| Scash | Common cash segment |
| cash | Cash segment |
| Ref | Cash segment reference |
| shad | Shadow memory |
| SC | System code - launch data set |
| D1 | Thickness of 4 |
| DL | Length change of 3 |
| FAO | Open antenna radiating surfaces |
| PA | Personal bracelet |

What is claimed is:

1. An identification system comprising
  a plurality of passive identification media (IM-S) each including an antenna for remote contactless reception of operating energy and for transmission and reception of encrypted high frequency signals; and
  an electronic data carrier (MI) comprising
    a data processor;

an electronic control, and a memory coupled to said data processor and having a data organization with a common data field (CDF) containing invariable and uncopiable master data with a unique record number (44), a segmentable application data field (ADF) for storing a plurality of independent applications (App1, App2, App3) in application memory segments (S1, S2, S3), each application segment including a segment identification, and wherein at least one said independent application (App2) includes more than one application segment (S2.1, S2.2, S2.3);

a plurality of read and write stations (WR) each having an antenna for remote, hands-free transmission and reception of signals from said identification media and for transmission of operating energy to said identification media antenna over a distance R and within a solid angle W; and a hierarchical authorization system (A) initialized in all of said identification media and all associated read and write stations for assuring mutual uninfluenceability of said independent applications and their applications segments (S1, S2, S3).

2. A system according to claim 1 wherein in said memory each application segment (S1, S2, S3) comprises a segment header (SCDF) with information and conditions valid for said segment and a generally available data field (SADF) for said application.

3. A system according to claim 2 wherein each said application segment includes in said segment header (SCDF) a user number (SSC) and read and write conditions for said application segment.

4. A system according to claim 3 wherein said read and write conditions include write protect (WRP), write condition (WRC) and read disable (RD).

5. A system according to claim 2 wherein each application segment includes a segment length (LEN) and a check sum control (CRC) of said application.

6. A system according to claim 1 wherein an amount of storage occupied by each application segment (S1, S2, S3) is freely selectable.

7. A system according to claim 1 wherein, for communication between an identification medium (IM-S) and a read and write station (WR), said read and write station includes a data processor for producing new initialization data with random numbers and for transmitting said data to said identification medium, said identification medium includes a fixed-store encrypting code (52) for encoding said initialization data and for re-transmitting, in an encoded form, said initialization data to said read and write station, and said read and write station includes a security module (SM-S) for decrypting said data and commencing synchronized communication between said read and write station and said identification medium.

8. A system according to claim 1 wherein said read and write station includes means for communicating with only one identification medium and only when a transmitting area of the read and write station includes no more than one identification medium.

9. A system according to claim 1 wherein said identification medium comprises a modifiable memory (EEPROM) having a storage location of at least 256 bytes.

10. A system according to claim 1 wherein said antenna and said data carrier of an identification medium are constructed in one piece and located on a printed ASIC.

11. A system according to claim 1 wherein said application data field (ADF) includes a shadow memory (shad) for receiving and buffer storing incoming data during a writing process so that said writing process is performed completely or not at all.

12. A system according to claim 1 wherein said application data field (ADF) includes modifiable cash segments (cash) to which data can be written by authorized read and write stations.

13. A system according to claim 1 wherein said application data field (ADF) includes a common cash segment (Scash) accessible by other authorized application segments (S1, S2, S3).

14. A system according to claim 1 wherein said data carrier (MI) includes a personal encoding function (33) having a PIN code or a biometric data code.

15. A system according to claim 1 wherein said authorization system (A) further includes, additional unsegmented identification media (IM) including only one independent application (App1) which can be processed by all authorized segmented and unsegmented read and write stations (WR).

16. A system according to claim 11 wherein, in accordance with said authorization system, a specific programming read and write station (WRI) and a specific authorization medium (AMI) include means for initializing each identification medium.

17. A system according to claim 16 wherein each identification medium is produced as a slave medium (72) by cooperating with a master authorization medium (AMI), said master medium transmitting a stamp into the memory of each slave medium which is no longer modifiable.

18. A system according to claim 17 wherein the length of said stamp is proportional to a hierarchical stage defining an organizational level (OL1, OL2).

19. A system according to claim 16 wherein each authorization medium (AMI) contains only one user number (SSC) and wherein only application segments (S1, S2, S3) with the same user number can be initialized and written.

20. A system according to claim 1 including a launching medium for entering a launch data set in a read and write station (WR) to thereby authorize said station to process a identification medium corresponding to said launch data set.

21. A passive identification medium (IM-S) for use in an identification system comprising an antenna (45) for remote, hands-free reception of operating energy and for transmission and reception of encrypted high frequency signals over a distance R and within a solid angle W to an associated read and write station (WR); and an electronic data carrier (MI) including a data processor, an electronic control, and a memory (42) coupled to said data processor and having a data organization with a common data field (CDF) containing invariable and uncopiable master data with a unique record number (44), a segmentable application data field (ADF) for storing a plurality of independent applications (App1, App2, App3) in application memory segments (S1, S2, S3), each application segment including a segment identification and a stamp of a hierarchical authorization system (A) for assuring mutual uninfluenceability of said independent applications and their application segments (S1, S2, S3) and wherein at least one said independent application (App2) includes more than one application segment (S22.1, S2.2, S2.3).

22. An identification system comprising a plurality of passive identification media (IM-S) each including an antenna for remote contactless reception of operating energy and for transmission and reception of encrypted high frequency signals; and an electronic data carrier (MI) comprising
- a data processor;
- an electronic control, and
- a memory coupled to said data processor and having a data organization with a common data field (CDF) containing invariable and uncopiable master data with a unique record number (44), a segmentable application data field (ADF) for storing a plurality of independent applications (App1, App2, App3) in application memory segments (S1, S2, S3), each application segment including a segment identification, said memory in said identification media further including a system data field (SDF) with data to insure compatibility with unsegmented identification media (IM) of said system;

a plurality of read and write stations (WR) each having an antenna for remote, hands-free transmission and reception of signals from said identification medium and for transmission of operating energy to said identification medium antenna over a distance R and within a solid angle W; and a hierarchical authorization system (A) initialized in all of said identification media and all associated read and write stations for assuring mutual uninfluenceability of said independent applications and their applications segments (S1, S2, S3).

23. An identification system comprising a plurality of passive identification media (IM-S) each including an antenna for remote contactless reception of operating energy and for transmission and reception of encrypted high frequency signals; and an electronic data carrier (MI) comprising
- a data processor;
- an electronic control, and
- a memory coupled to said data processor and having a data organization with a common data field (CDF) containing invariable and uncopiable master data with a unique record number (44), a segmentable application data field (ADF) for storing a plurality of independent applications (App1, App2, App3) in application memory segments (S1, S2, S3), each application segment including a segment identification, a plurality of read and write stations (WR) each having an antenna for remote, hands-free transmission and reception of signals from said identification medium and for transmission of operating energy to said identification medium antenna over a distance R and within a solid angle W; and a hierarchical authorization system (A) initialized in all of said identification media and all associated read and write stations for assuring mutual uninfluenceability of said independent applications and their applications segments (S1, S2, S3)

said system further including identification media assigned to a plurality of independent users, and including identification media having combinations of a plurality of independent applications which differ from each other, said read and write stations for said applications being autonomous and decentralized and connected for communication with a master host computer (75).

* * * * *